United States Patent [19]

Yoshiike et al.

[11] Patent Number: 5,567,052
[45] Date of Patent: *Oct. 22, 1996

[54] TEMPERATURE DISTRIBUTION MEASUREMENT APPARATUS

[75] Inventors: Nobuyuki Yoshiike, Ikoma; Koji Arita, Osaka; Katsuya Morinaka, Hirakatashi, all of Japan

[73] Assignee: Matsushita Electric Industrial Co., Ltd., Kadoma, Japan

[*] Notice: The term of this patent shall not extend beyond the expiration date of Pat. No. 5,528,038.

[21] Appl. No.: 372,855

[22] Filed: Jan. 13, 1995

Related U.S. Application Data

[63] Continuation of Ser. No. 91,374, Jul. 15, 1993, abandoned.

[30] Foreign Application Priority Data

Aug. 3, 1992 [JP] Japan .................................. 4-205841
Feb. 26, 1993 [JP] Japan .................................. 5-037748

[51] Int. Cl.⁶ .............................. G01J 5/08; G01J 5/62
[52] U.S. Cl. .............................. 374/124; 374/130; 374/45; 250/338.3
[58] Field of Search .............................. 374/124, 130, 374/137, 45; 250/332, 334, 338.3

[56] References Cited

U.S. PATENT DOCUMENTS

| | | | |
|---|---|---|---|
| 3,350,562 | 10/1967 | Flint . | |
| 3,889,117 | 6/1975 | Shaw Jr. | 250/334 |
| 4,072,863 | 2/1978 | Roundy | 250/332 |
| 4,481,535 | 11/1984 | Hodd et al. | 250/334 |
| 4,703,179 | 10/1987 | Motooka | 250/334 |
| 4,747,698 | 5/1988 | Wickramasinghe et al. | 374/124 |
| 4,791,297 | 12/1988 | Savoca et al. | 250/347 |
| 4,840,496 | 6/1989 | Elleman et al. | 374/124 |
| 4,907,895 | 3/1990 | Everest | 374/130 |
| 5,008,522 | 4/1991 | Lundin | 250/203.6 |
| 5,055,683 | 10/1991 | McCracken | 250/332 |
| 5,075,553 | 12/1991 | Noble et al. | 250/332 |
| 5,159,200 | 10/1992 | Dunbar et al. | 250/350 |

FOREIGN PATENT DOCUMENTS

| | | | |
|---|---|---|---|
| 0461837 | 12/1991 | European Pat. Off. . | |
| 0283304 | 10/1990 | Germany | 250/334 |
| 56-21025 | 2/1981 | Japan | 250/334 |
| 57-124981 | 8/1982 | Japan | 374/130 |
| 61-186826 | 8/1986 | Japan | 374/124 |
| 63-280452 | 11/1988 | Japan | 250/332 |
| 4-175623 | 6/1992 | Japan | 374/124 |

OTHER PUBLICATIONS

Patent Abstracts of Japan, JP 1035696, Publication date: Feb. 6, 1989 (Application No.: JP870190468)(only abstract considered).

Patent Abstracts of Japan, JP 2196932, Publication date: Aug. 3, 1990 (Application No.: JP890017091) (only abstract considered).

*Primary Examiner*—Diego F. F. Gutierrez
*Attorney, Agent, or Firm*—McDermott, Will & Emery

[57] ABSTRACT

A temperature distribution measurement apparatus has an infrared array sensor that comprises a pyroelectric substrate with infrared ray detecting electrodes, a focusing member comprising an infrared lens for focusing incident infrared rays on the infrared array sensor, a cylindrical chopping member for intermittently shielding incident infrared rays from the plurality of detector elements and a driving member for continuously rotating a rotating member which includes the infrared array sensor. The temperature distribution measurement apparatus combined with computational means and detector means is applied to determine number, position, and movements of persons in a space.

24 Claims, 16 Drawing Sheets

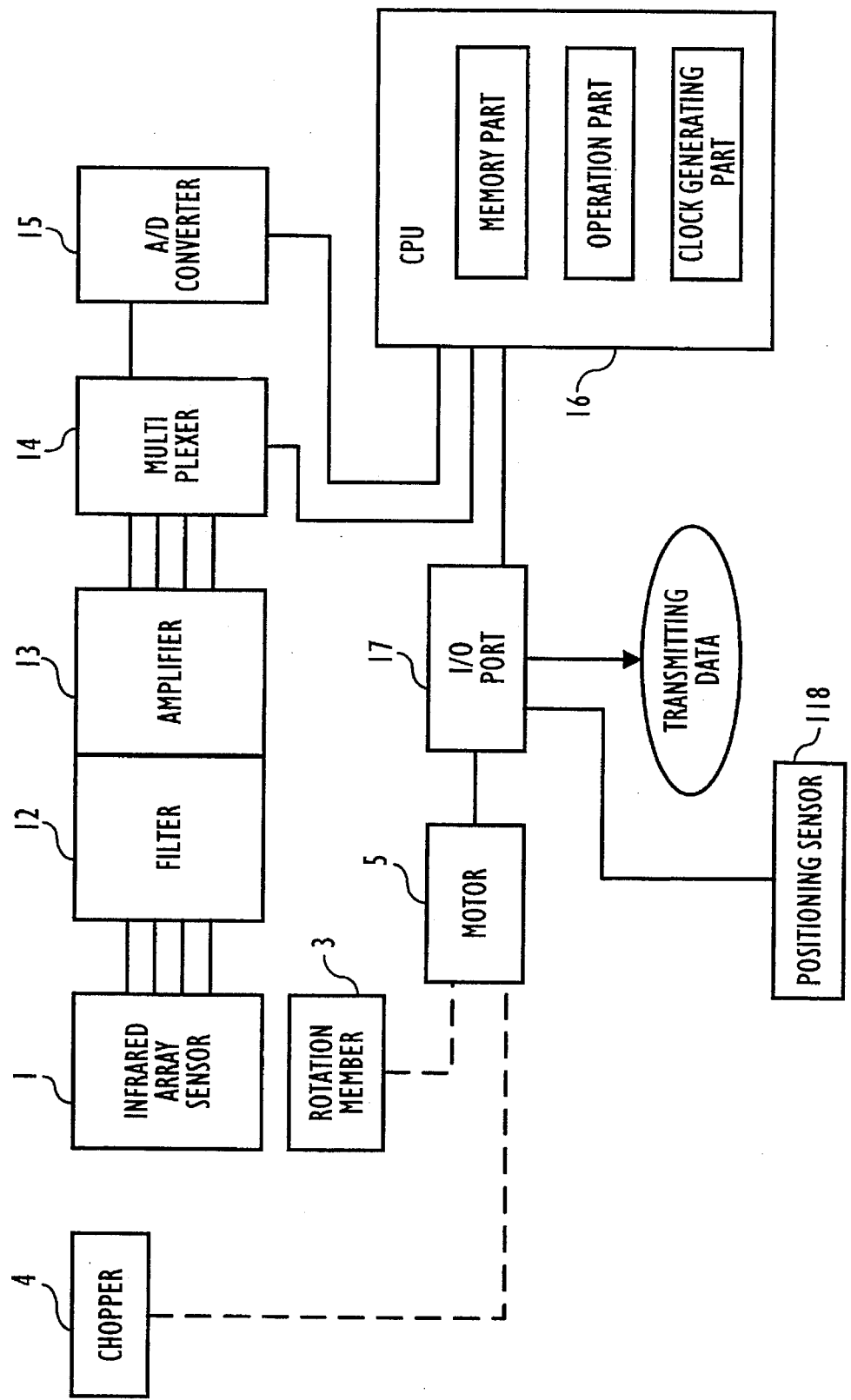

TEMPERATURE DISTRIBUTION MEASUREMENT APPARATUS

This is a Continuation Application of application Ser. No. 08/091,374, filed July, 15, 1993, now abandoned.

BACKGROUND OF THE INVENTION

1. Field of the Invention

The present invention relates to a temperature distribution measurement apparatus that utilizes a pyroelectric type infrared sensor and its application to a human body detecting system.

2. Discussion of Related Art

In recent years, demand has developed for devices and methods to measure room temperature distribution to detect the presence of human beings and their motion in a room. Such devices and methods find use in maintaining security, controlling air conditioning and similar applications.

Several methods have been developed to measure temperature distribution in an area which utilize infrared radiation. One of the known methods uses an application of two dimensional quantum effect type solid state infrared image sensors and another an application of pyroelectric infrared sensors.

The quantum effect type sensor provides high accuracy and high resolution temperature distribution measurement but the sensor requires a cooling system which is too costly for use with home applications.

A method exists for determining the temperature distribution in an area by detecting input energy of one direction after another through a single pyroelectric sensor that performs directional scanning vertically as well as horizontally (see Japanese Laid-Open Patent Nos. 57-185695, 2-183752, 2-196932, U.S. Pat. Nos. 5,159,200, 4,791,297 and 4,907,895).

The pyroelectric sensor has the disadvantages of low resolution in space and temperature, which result from low sensitivity, high complexity of construction, and difficult signal processing.

SUMMARY OF THE INVENTION

Accordingly, the present invention relates to a temperature distribution measurement apparatus comprised of an infrared array sensor, a focusing means for focusing incident infrared rays on the infrared array sensor, a chopping means for intermittently shielding incident infrared rays from the infrared array sensor, and a driving means for continuously rotating a rotation member, the rotation member having disposed thereon the infrared array sensor.

In one embodiment, the focusing means comprises an infrared lens for focusing the incident infrared rays on the infrared array sensor, the chopping means is cylindrical and has windows on its side which are equidistant from one another for intermittently shielding incident infrared rays from the infrared array sensor, and the driving means continuously rotate together the rotation member, which includes the infrared array sensor, the focusing means and the chopping means. Therefore, inherently, the rotation of the rotation member and the chopping means is synchronized. Additionally, this embodiment comprises a housing for supporting the cylindrical chopping means and the rotation member, and cables wired on a flexible substrate, one end of the cables being connected to the rotation member, another end being connected to the housing, and a middle part of the cables being bent or twisted and absorbing the deformation.

Furthermore, the driving means of an embodiment of the present invention may comprise a brushless motor, which may be used for continuously rotating together the rotation member comprising the infrared array sensor, the focusing means and the cylindrical chopping means, and the cylindrical chopping means is covered by a cylindrically shaped housing.

In one exemplary embodiment, a timing means detecting timing for chopping is located on the chopping means or the rotation member.

Preferably, the timing means of this exemplary embodiment detects a signal that controls the starting time and the stopping time of a sampling output signal of the infrared array sensor.

The present invention also relates to a temperature distribution measurement apparatus further comprising an adder means for calculating the temperature measurement by successively adding sampling output signals during a period determined by the signal detected by the timing means.

In another exemplary embodiment, the chopping means and rotation member and a position detecting means for detecting the position of the rotation member are arranged on the housing and the rotation member.

Furthermore, the present invention relates to a temperature distribution measurement apparatus which includes a brushless motor having frequency generator patterns and a permanent magnet, and the rotation speed of the brushless motor and the condition of rotation of the rotation member and chopping means is controlled by induced electric current caused by movement of the permanent magnet on the frequency generator patterns.

Furthermore, the present invention relates to a temperature distribution measurement apparatus which includes signal wires for timing and/or signal wires for a thermistor are wired on a flexible substrate.

Furthermore, the present invention relates to a temperature distribution measurement apparatus in which the chopping means has fins for cooling the infrared array sensor by its movement.

Furthermore, the present invention relates to a temperature. distribution measurement apparatus which includes an infrared lens for focusing a spherical chalcogens glass lens or a spherical silicon lens.

Furthermore, the present invention relates to a temperature distribution measurement apparatus in which the focusing means is arranged in front of the infrared array sensor.

Furthermore, the present invention relates to a temperature distribution measurement apparatus comprising a chopping means having n windows and which rotates $\theta_c$ degrees, while the rotation member rotates $\theta_s$, degrees during one opened and closed phase of chopping and satisfying the equation:

$$\theta_c = (360/n \pm \theta_s)$$

Furthermore, the present invention relates to a temperature distribution measurement apparatus comprising a chopping means having n windows and which rotates $\theta_c$ degrees, while said rotation member rotates $\theta_s$ degrees during one opened and closed phase of chopping and satisfying the equation:

$\theta_c/\theta_s$=integer

Furthermore, the present invention relates to a temperature distribution measurement apparatus wherein rotating direction can be changed after measuring one rotating direction, by rotating backward the driving means for rotating the rotation member.

As pointed out in greater detail below, the temperature distribution measurement apparatus based on an infrared array sensor as taught by the present invention provides the important advantages of accurately measuring the temperature distribution in an area in a cost-efficient manner. The invention itself, together with further objects and attendant advantages, will best be understood by reference to the following detailed description in conjunction with the accompanying drawings.

BRIEF DESCRIPTION OF THE DRAWINGS

FIG. 6 is a schematic block diagram showing an electric circuit system in the temperature distribution measurement apparatus of this invention.

DETAILED DESCRIPTION OF THE PREFERRED EMBODIMENT

Figure 1:
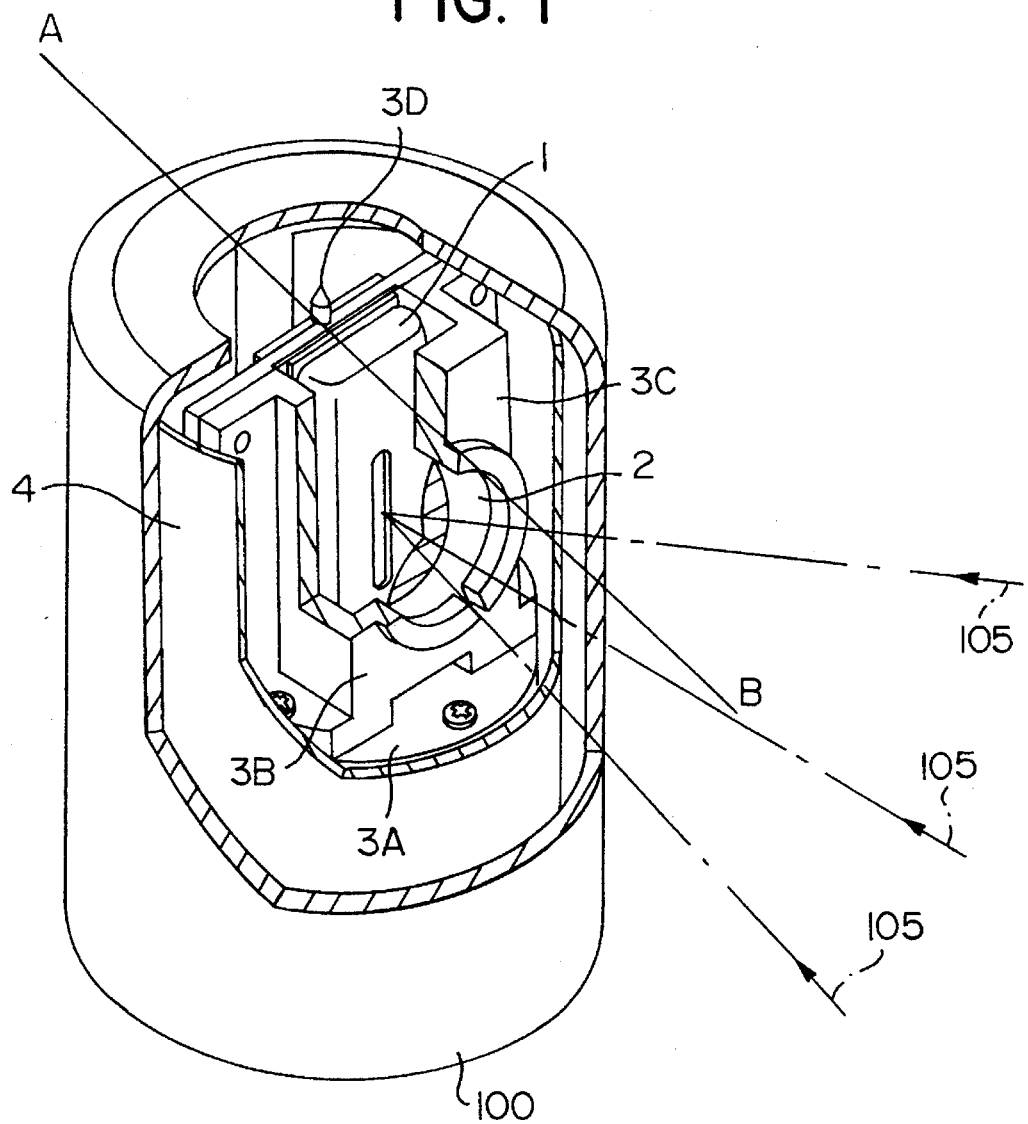
FIG. 1 is a perspective view showing a temperature distribution measurement apparatus of one embodiment of this invention.

The preferred embodiments of the invention will now be described in conjunction with the illustrations thereof in the drawings.

EXAMPLE 1

Figure 2:
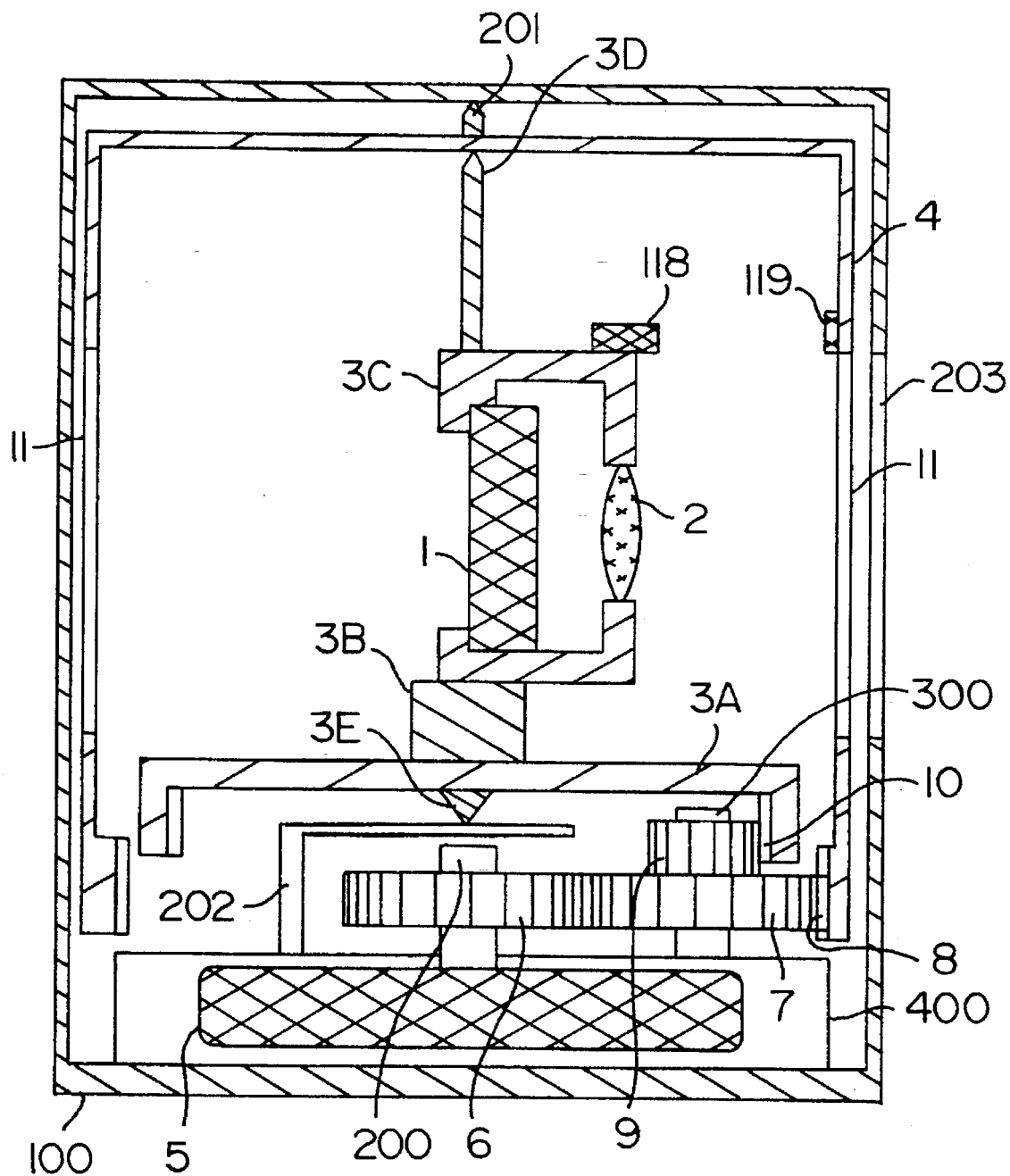
FIG. 2 is a partially cutaway perspective view of the temperature distribution measurement apparatus of this invention.

The first embodiment of the invention is illustrated in FIGS. 1–2. FIG. 1 shows a partially cutaway perspective view of a temperature distribution measurement apparatus. FIG. 2 is a cross-sectional view taken along line A–B of the temperature distribution measurement apparatus of FIG. 1. In FIGS. 1 and 2, 100 denotes a housing of the temperature distribution measurement apparatus. In the housing 100, a chopper 4 is disposed in such a manner that the chopper 4 is rotated by a motor 5. The chopper 4 has a cylindrical shape. In the chopper 4, a rotation member 3 is disposed in such manner that the rotation member 3 is rotated by the motor 5 in the chopper 4 and also in the housing 100. As is apparent from FIG. 2, the rotation member 3 includes a base portion 3A, a rotational axis portion 3B, a support portion 3C, and rotational spindle portions 3D, 3E. These five portions are integrally made by use of a suitable material, such as synthetic resin. The support portion 3C supports an infrared array sensor 1 which includes a plurality of detector elements and an infrared lens 2 which is used for focusing infrared rays 105 which are radiated from objects to be detected, such as human bodies, on the infrared array sensor 1.

Figure 3:
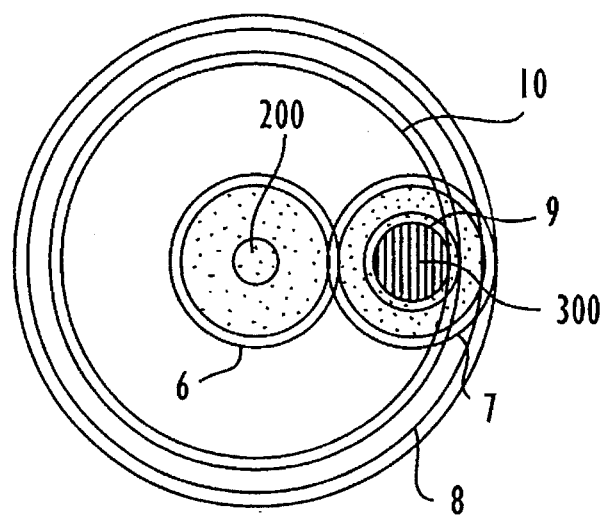
FIG. 3 is a constitutional view showing the relative position of gears in the temperature distribution measurement apparatus of this invention.

As explained above, the chopper 4 is rotated by the motor 5. As shown in FIG. 2, the motor 5 is fixed on a bottom portion of the housing 100. A first gear wheel 6 is fixed to a rotation spindle 200 of the motor 5. Gear teeth 8 are formed at a lower end portion of an inner surface of the chopper 4. The gear teeth 8 are coupled to the first gear wheel 6 through a second gear wheel 7 which is rotatably mounted around an axis 300 disposed on a base 400. As also explained above, the rotation member 3 is supported by a stand 202 and the rotational spindle portions 3D, 3E and it is rotated by the motor 5. As is apparent from FIG. 2, an inner surface of the base portion 3A has gear teeth 10. The gear teeth 10 are engaged with a third gear wheel 9 which is rotatably mounted around the axis 300. The third gear wheel 9 is rotated by the motor 5 through the first gear wheel 6 and the second gear wheel 7. FIG. 3 shows a layout pattern of the gear wheels 6, 7, 9 and the gear teeth 8, 10.

Figure 4:
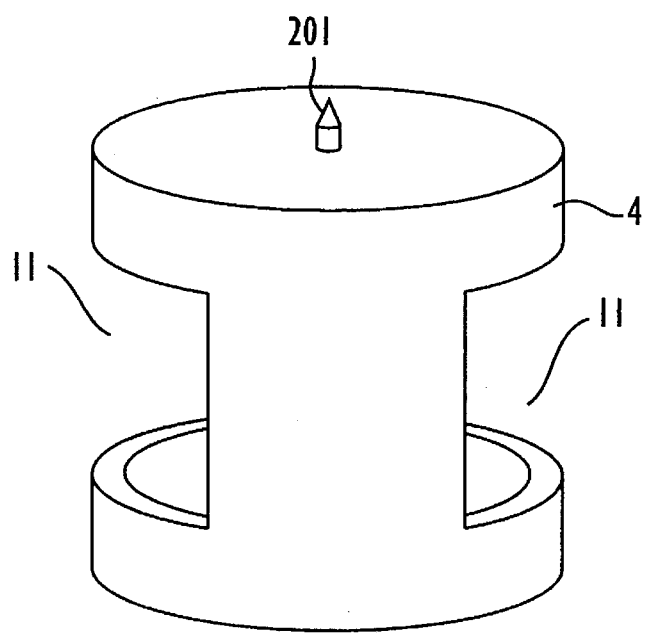
FIG. 4 is a perspective view showing a chopper in the temperature distribution measurement apparatus of this invention.

As shown in FIG. 4, the chopper 4 has two windows 11 which are located opposite one another (i.e., the center of the first window is 180 degrees away from the center of the second window). The infrared rays are incident on the infrared array sensor 1 through a window 203 (as shown in FIG. 2) of the housing 100 and the windows 11 of the chopper 4. The window 203 of the housing 100 extends around the circumference of the housing 100 of the apparatus shown in FIGS. 1–4. When the motor 5 is driven, the chopper 4 rotates continuously around the chopper axis 201 and intermittently shields the infrared rays 105. At the same time, the rotation member 3 is also rotated by the motor 5.

Infrared rays 105 are focused by the infrared lens 2 onto the infrared array sensor 1 so that the vertical temperature distribution of the area facing the infrared array sensor 1 and the infrared lens 2 is measured.

Thus, by rotating the rotation member 3 and changing the position of the infrared array sensor 1 and the infrared lens 2 while the chopper 4 is rotated, the vertical temperature distribution of the area facing the infrared array sensor 1, at a given position of the chopper 4, is measured.

Figure 5A:
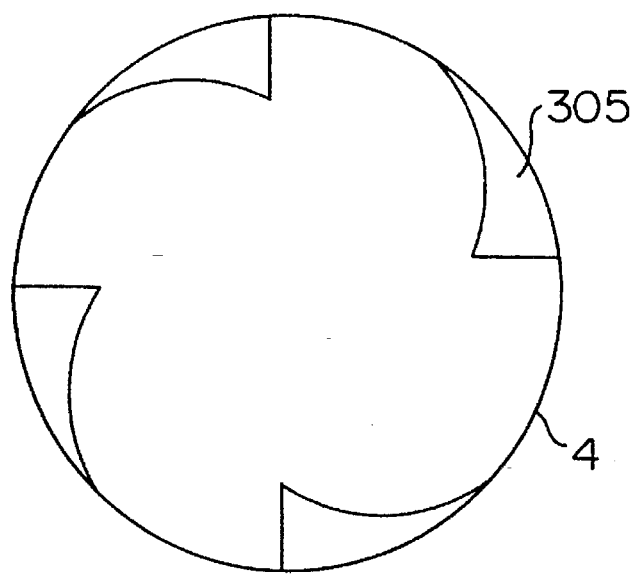
FIG. 5A is a top plan view showing a cylindrical chopper with fins in the temperature distribution measurement apparatus of this invention.
Figure 5B:
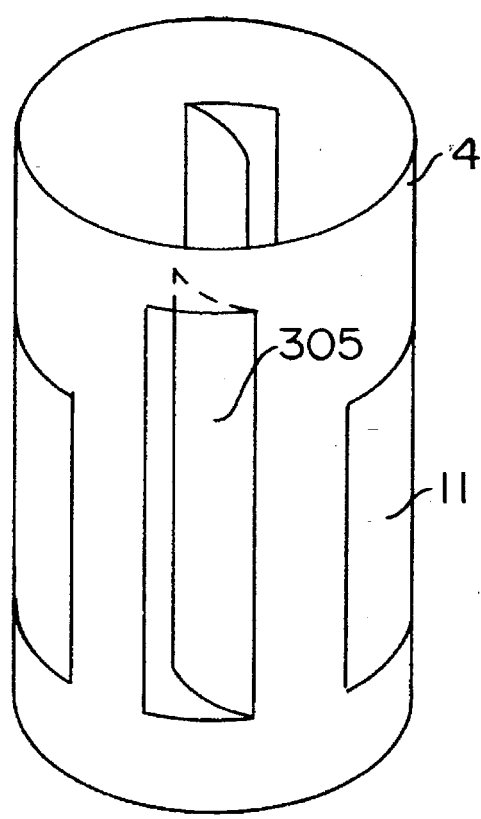
FIG. 5B is a perspective view showing a cylindrical chopper with fins in the temperature distribution measurement apparatus of this invention.

After this measurement is completed, the temperature distributions in different positions for the area facing the chopper 4 are obtained in a similar fashion. Subsequently, the temperature distributions in all positions are connected with each other vertically by signal processing, and a reversed two dimensional temperature distribution in the open space is obtained. In this process of measurement, after measuring the last position of the space facing the infrared array sensor 1, the motor 5 is driven backward to return the infrared array sensor 1 to the initial position. At that time, the infrared array sensor 1 is ready for the next measurement. The range of the area that can be covered by the measurement depends on the viewing angle of the infrared lens 2 and the dimensions of the infrared array sensor 1. Furthermore, it is possible to make n openings and closings for the infrared array sensor 1 in one rotation of the chopper 4 by equipping the chopper 4 with n windows. It is also possible to cool down the infrared array sensor 1 by equipping the chopper 4 with fins. This is shown in FIGS. 5A and 5B, wherein a cylindrical chopper 4 has four fins 305.

Figure 7:
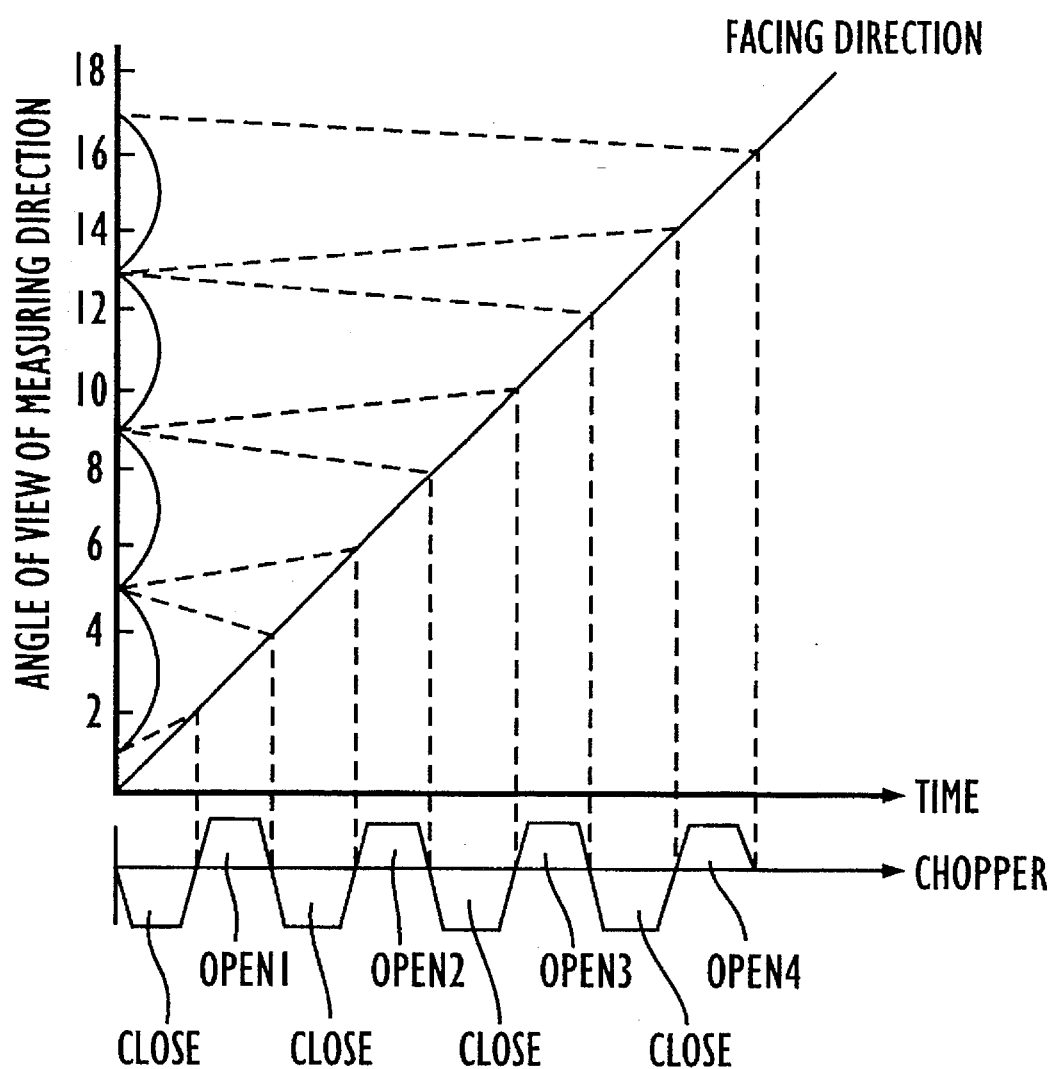
FIG. 7 is a graph showing the timing between chopping and direction of measurement in the temperature distribution measurement apparatus of this invention.

FIG. 6 shows a block diagram Of an apparatus used to analyze and process the electrical signals of the measurement apparatus. An I/O port 17 is electrically connected to a motor 5 and to a CPU 16 which includes a clock signal generator, an operator, and a data memory. The signal from the infrared array sensor 1 is amplified by a filter 12 and an amplifier 13, and is selected by a multiplexer 14. The selected element of the signal is processed by an A/D converter 15 and is inputted into the CPU 16. By rotation of the rotation member 3 and continuous rotation of the chopper 4 by the motor 5, an output of the infrared array sensor 1 is obtained as represented in the timing of electric signal wave shape shown in FIG. 7. FIG. 7 shows the relation between interval time of measurement, phase change of chopper 4, angle of space facing the infrared array sensor 1 of the rotation member 3 and range of angle of view.

In FIG. 7 when starting the measurement, the direction of the chopper 4 is fixed at 0 degrees, and chopping begins with an open phase. Each gear wheel 6, 7, 9 has a predetermined number of teeth such that an open and close phase of chopping occurs once in 4 degrees of rotation of the infrared array sensor 1. In this case, the effective angle of view to right and left is fixed at 2 degrees in either direction.

In the first open phase of chopping, the thermal energy of 1 degree to 5 degrees is measured as shown in FIG. 7.

In the second, third, and fourth open phases of chopping, the thermal energy of 5 degrees to 9 degrees, 9 degrees to 13 degrees, and 13 degrees to 17 degrees is measured, respectively.

If it is assumed that the number of detector elements on the infrared array sensor 1 is n and the angle of sweep of the infrared array sensor 1 in one opened and closed phase of chopping is θ degrees, then the address of data can be expressed, for example, as $S_{01}, S_{02} \ldots S_{0n}$. After each step, the data is stored. After the mth forward rotation, the addresses of data are expressed as $S_{m1}, S_{m2} \ldots S_{mn}$. After measuring the last direction of the space facing the infrared array sensor 1 (the mth measurement), based on the signal received from the CPU 16, the direction of rotation is reversed. The motor 5 is rotated (mXθ) degrees in the reverse direction, and back to its initial position, and it is ready for the next measurement. The reverse rotating speed should be as fast as possible. The measurement data is processed as a matrix as follows:

$Sm_1, Sm_2 \ldots S_{0n}$ $S_{11}, S_{12} \ldots S_{1n}$ $S_{m1}, S_{m2} \ldots S_{mn}$ Thus, the temperature distribution of the open space can be measured with a resolving power of nXm. The timing of receiving the data processing signal is estimated from a relative interval of chopping which is determined by a positioning sensor 118 placed in the rotation member 3 and a sensitive plate 119 placed in the chopper 4. This is shown in FIG. 2. Suitable elements which can be used as a pair of the sensitive plate 119 and the positioning sensor 118 are a permanent magnet as the sensitive plate 119, and a hole element as the positioning sensor 118; a photo reflectance plate as the sensitive plate 119 and a photodiode or phototransistor as the positioning sensor 118; or a thin plate as the sensitive plate 119, and a photointerrupter as the positioning sensor 118. The timing means of this embodiment comprises the positioning sensor 118, and the sensitive plate 119, which can be any one of the exemplary elements described above or any equivalents thereof. The positioning sensor 118 detects the position of the rotation member. The use of these timing means is described in detail below. The timing of a receiving data processing signal is estimated from the measurement of each chopping interval.

A specific example of measurement will now be explained in conjunction with FIG. 2. The infrared array sensor 1 is set with its longer axis positioned vertically and the rotation member 3 and the chopper 4 are driven at 10 Hz. Then, the vertical dose distribution of the thermal radiations, namely, the vertical temperature distribution of the space of 4 degrees of horizontal (right and left) range can be measured every 1/10 second. The range of the space that can be covered by measurement is determined by the viewing angle of the infrared lens 2 and the sensor dimensions. The vertical space resolution is determined by the number of the infrared detecting electrodes contained in the infrared array sensor 1.

For example, when the viewing angle of the infrared lens 2 is 80 degrees and the infrared array sensor 1 has 10 detector elements, the vertical resolving power is 10 and each detector element measures the temperature in an 8 degree arc.

EXAMPLE 2

In this exemplary embodiment, the relation of relative rotation speed between the rotation member 3 and the chopper 4 is governed by the following constraints and assumptions.

In this embodiment, if $θ_s$ is the degrees traversed during one opened and closed phase of chopping, the chopper 4 has n opened and closed phases in one rotation. The rotation member 3 and the chopper 4 rotate in the same direction. The rotating angle of the chopper 4, $\theta_c$ is expressed as $$\theta_c = 360/n + \theta_s$$

When using a transmission and one driving means to rotate the rotation member 3 and the chopper 4, the ratio of the rotating speed of rotation member 3, Rs, and the rotating speed of the chopper 4, Rc, is expressed as follows:

$$R = Rc/Rs = \theta_c/\theta_s$$

The transmission ratio R must be an integer for consistently chopping in equal intervals.

This example of the embodiment of the invention will be explained in more detail in conjunction with FIG. 8.

The chopper 4, comprising chopping windows 11, is directly driven by the motor 5, and the rotation member 3 is connected to the motor 5 through a transmission 18 comprising four gears, G1 to G4.

If the motor 5 rotates at a rotating speed of Rm, the rotation speed of the chopper 4 equals Rm.

The rotation speed Rs of the rotation member 3 is decreased by the transmission 18 and it rotates slowly.

For example, if the number n of windows 11 of the chopper 4 equals 2, and the degrees $\theta_s$ which the rotation member 3 sweeps during chopping in one opened and closed phase equals 6 degrees, R as defined by the above equation, equals 31.

If the chopping frequency is fixed at 10 Hz, then the degrees of rotation of the chopper 4 during one second, $\theta c10$, is defined as follows:

$$\theta c10 = \theta_c \times 10 = (360/2 + 6) \times 10 = 1860 \text{ (degrees)}$$

The rotation speed Rc10 of the chopper 4 is defined as:

$$Rc10 = 1860 \times 60/360 = 310 \text{ (rpm)}$$

And by the aforementioned equation, the rotation speed Rs10 of the rotation member 3 equals:

$$Rs10 = Rs10/R = 310/31 = 10 \text{ (rpm)}$$

Thus, it is possible to measure a range of 120 degrees in 2 seconds. It is important to note that causing the transmission ratio R to be an integer facilitates the reduction of the rotation speed Rs of the rotation member 3 via the transmission 18.

Figure 8:
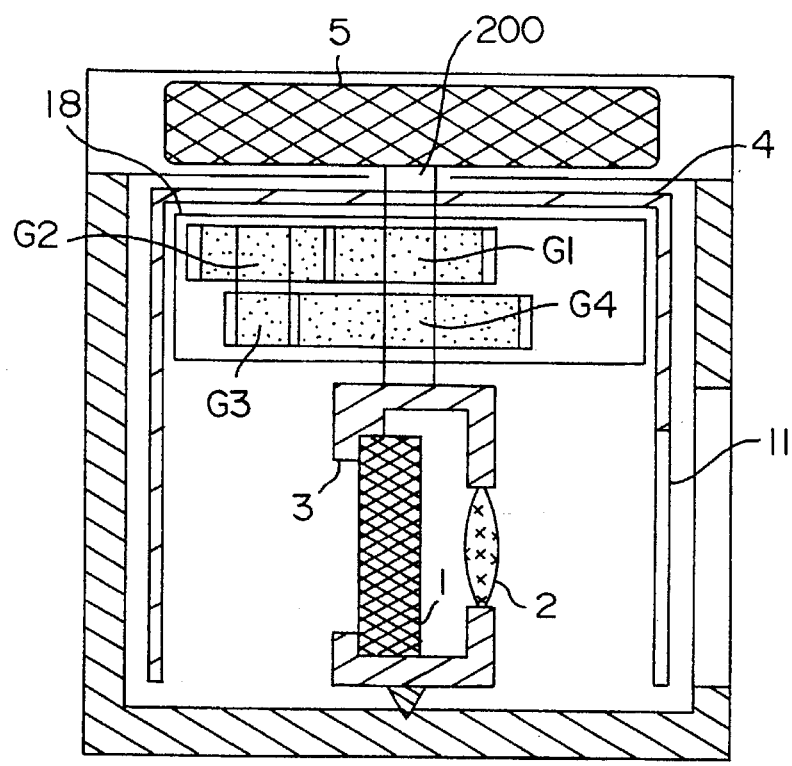
FIG. 8 is a cross-section of a partially cutaway view showing an outline of the temperature distribution measurement apparatus in another embodiment of this invention.

In the transmission 18 illustrated in FIG. 8, the gear G1 is driven directly by the motor 5, gears G2 and G3 are fixed together so as to rotate about the same axis and G4 drives the rotation member 3.

In this transmission 18, if the number of teeth is denoted as G1, G2, G3, G4, the G1, G2, G3, G4 need to satisfy the following equation.

$$R = (G2/G1) \times (G4/G3) = 31$$

As will be appreciated by one skilled in the art, the number of windows of the chopper 4, rotation speed Rs, Rc of the rotation member and the chopper, respectively, and mechanism of rotation and transmission are not restricted to the values set forth as illustrations in the above embodiment.

The rotation member 3 and the chopper 4 can also rotate in different directions. If so, the rotation angle $\theta_c$ of the chopper is defined as follows:

$$\theta_c = 360/n - \theta_s$$

The operation of the chopper 4 and the rotation member 3 is otherwise the same as the operation of the device described in Example 2.

EXAMPLE 3

In example 1, the temperature distribution measurement apparatus utilizes a single gear 7 for rotating the chopper 4 and a single gear 9 for rotating the rotation member 3.

Figure 9:
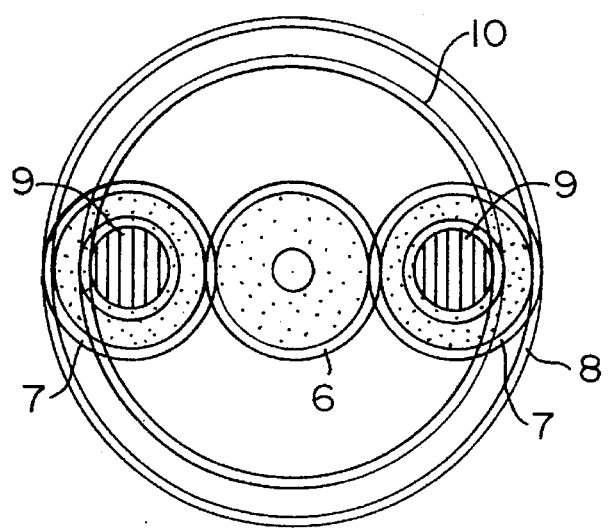
FIG. 9 is a constitutional view showing relative position of gears in another embodiment of this invention.

However, as shown in FIG. 9, by utilizing two gears 7, 7' to rotate the chopper 4 and two gears 9, 9' to rotate the rotation member 3 it is possible to rotate the chopper 4 and the rotation member 3 smoothly and therefore remove unwanted vibrations (i.e., shaking) of the members during rotation.

EXAMPLE 4

In example 4, the number of forward and backward rotations is controlled by the CPU 16.

In FIG. 2, a first stop switch is positioned to contact the rotation member 3, which is initially rotated in the reverse direction. This is after the signal is sent to CPU 16 from the first stop switch.

Then, the rotation member 3 is returned to the initial direction, contacts the second stop switch, and stops its reverse directioned rotation. During this time the chopper 4 moves the same way.

In addition, it is possible to control forward rotation or backward rotation of the rotation member 3 by a stop switch.

It is also possible to stop or continuously drive the chopper 4 during backward rotation of rotation member 3.

Furthermore, it is possible to only reverse the rotation of the rotation member 3 by changing gears or by changing to another system of gears.

Figure 12:
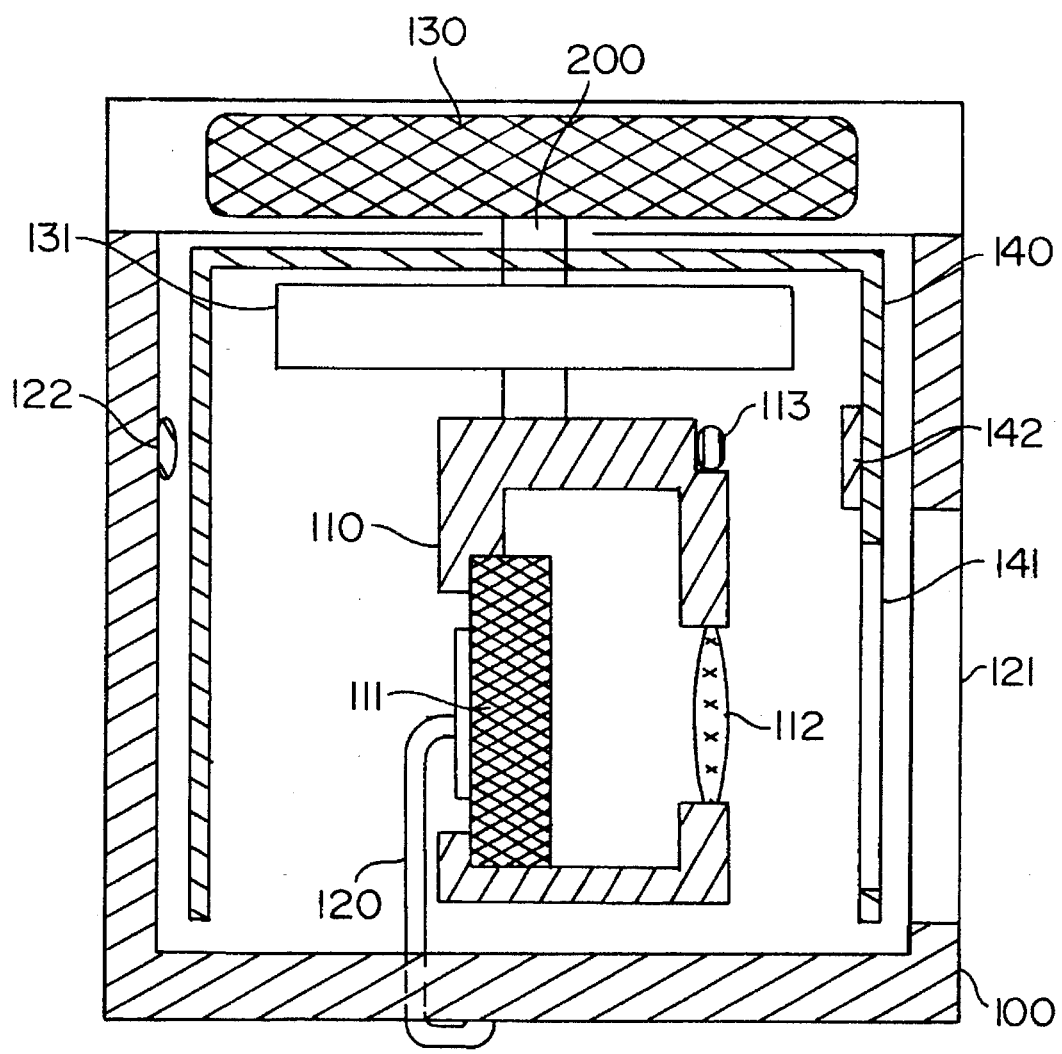
FIG. 12 is a partially cutaway perspective view showing the outline of the temperature distribution measurement apparatus in another embodiment of this invention.

Finally, as shown in FIG. 12, it is possible to mount a light intercepting component 122 on the housing 100 for stopping the rotation of the rotation member 3.

EXAMPLE 5

The apparatus described in the first embodiment of the present invention, first measures the forward direction by rotating the rotation member 3 forward.

By changing the direction of the infrared array sensor 1 and the infrared lens 2 and also by driving the chopper 4 in the same manner as in the foregoing, a temperature distribution is measured.

The data received during the measurements is processed in matrix form.

$$\begin{matrix} So_1 & \ldots & \ldots & \ldots & \ldots & Son \\ Sm_1 & \ldots & \ldots & \ldots & \ldots & Smn \end{matrix}$$

The temperature distribution of an open space can be measured with a resolving power of nxm.

Next, after measuring the last direction facing the infrared array sensor 1 and the infrared lens 2 (the mth measurement), the motor is directed to rotate backward under control of the CPU 16.

Then, the temperature distribution is measured successively to the direction where the infrared array sensor 1 and the infrared lens 2 initially faced.

$$Sm_1 \quad \ldots \quad \ldots \quad \ldots \quad \ldots \quad Smn$$
$$So_1 \quad \ldots \quad \ldots \quad \ldots \quad \ldots \quad Son$$

The data is processed in matrix form, and the temperature distribution of the open space can be measured with a resolving power nxm.

The elements of this matrix are not arranged in the same places as in the initial data matrix which was formed previously.

To arrange in the same form, the operation in the backwards rotation shown in example 1 can be utilized.

EXAMPLE 6

Figure 10:
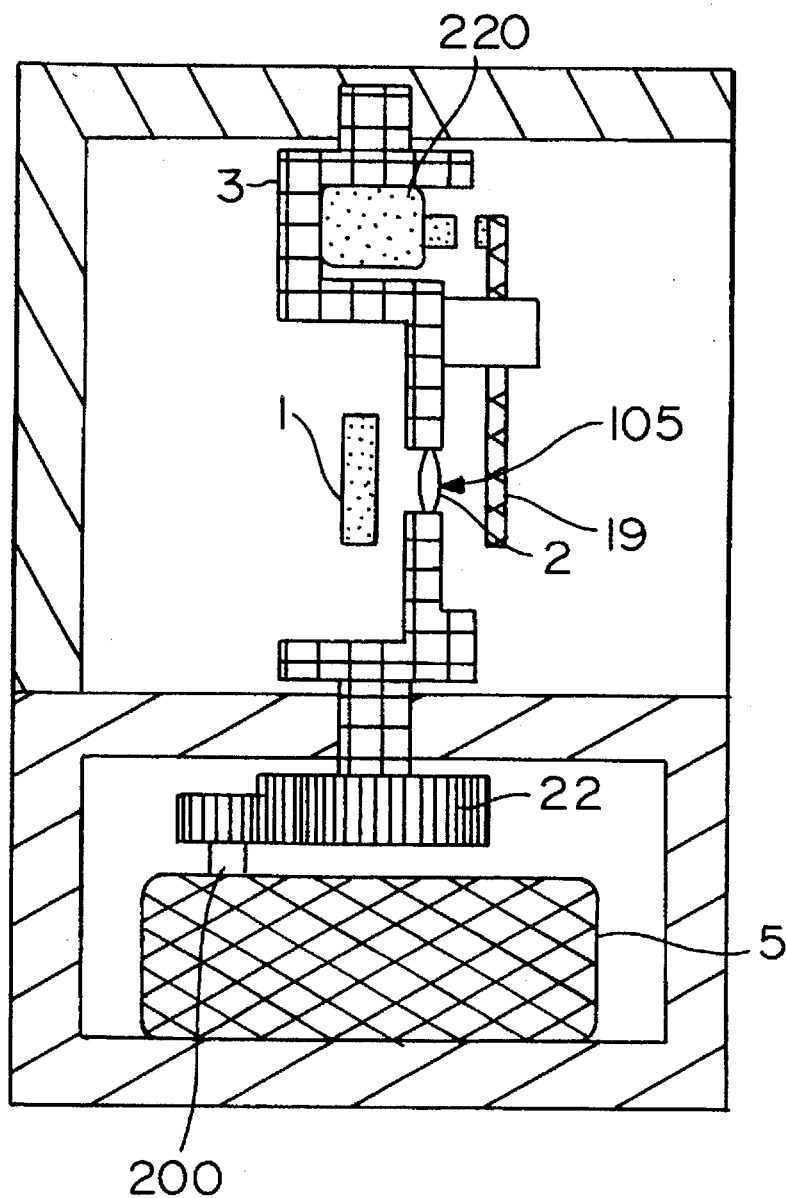
FIG. 10 is a partially cutaway perspective view showing the outline of the temperature distribution measurement apparatus in another embodiment of this invention.
Figure 11:
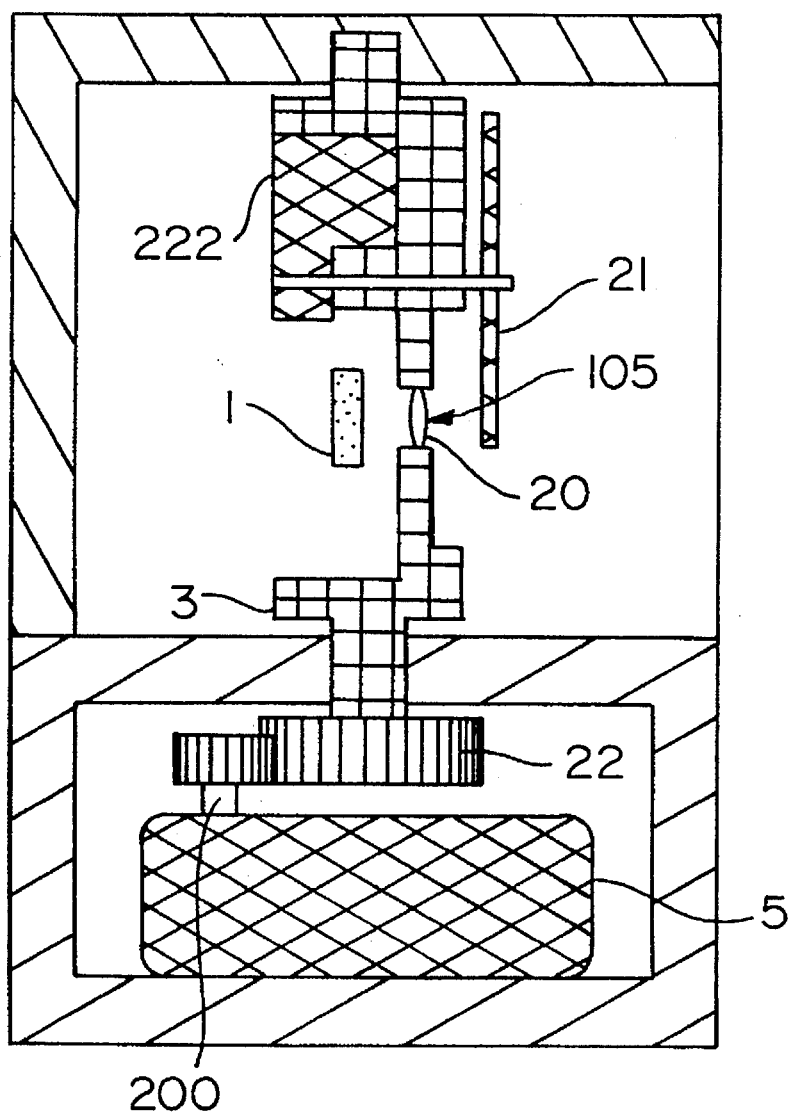
FIG. 11 is a partially cutaway perspective view showing the outline of the temperature distribution measurement apparatus in another embodiment of this invention.

FIGS. 10 and 11 illustrate a third and fourth embodiment, respectively, of the present invention.

In FIG. 10 a pendulum chopper 19 functions as the chopper and is driven by a compact sized solenoid 22.

In FIG. 11 a rotating disc type chopper 21 functions as the chopper and is driven by a compact sized motor 22.

The other parts are the same as above.

The temperature distribution measurement apparatus illustrated in FIGS. 10 and 11 achieves substantially the same results as the apparatus described in conjunction with the first embodiment.

EXAMPLE 7

A measurement apparatus of the foregoing example can be mounted on the upper part of the walls of a room that measures about 6 meters by 6 meters to measure the temperature distribution of the entire room.

If the number of the detector elements of the infrared array sensor 1 utilized is 10 and the right and left rotational steps are set at 30, then the temperature distribution of the open space is expressed by a matrix of 10×30 as follows:

$$S_{00.01}, S_{00.02} \quad \ldots \quad \ldots \quad \ldots \quad \ldots \quad S_{00.10}$$
$$S_{01.01}, S_{01.02} \quad \ldots \quad \ldots \quad \ldots \quad \ldots \quad S_{01.10}$$
$$\cdot$$
$$\cdot$$
$$\cdot$$
$$S_{30.01}, S_{30.02} \quad \ldots \quad \ldots \quad \ldots \quad \ldots \quad S_{30.10}$$

From the distribution data of the measured temperature of more than 32 degree C, existence and number of persons in the room are detected.

It is difficult to discriminate between one person located near the measurement apparatus and multiple persons gathering in a distant location by only one time measurement.

However, it is possible to make a judgment from experience by analyzing the changes in the temperature distribution over a period of time. In addition, a judgment on the magnitude of the activity of the persons in the room can be made in a qualitative manner.

Moreover, the use of a fuzzy theory and the membership function provides an effective method for performing the above determination.

EXAMPLE 8

Next referring to FIG. 12, a detailed example of timing means of the present invention is explained.

In FIG. 12, the housing 100 supports a motor (driving means) 130. The housing 100 comprises a window 121. A photocoupler 113 is positioned on the rotation member 110. A light reflecting plane 142 is positioned on the inside of a cylindrical chopper 140.

Figure 13:
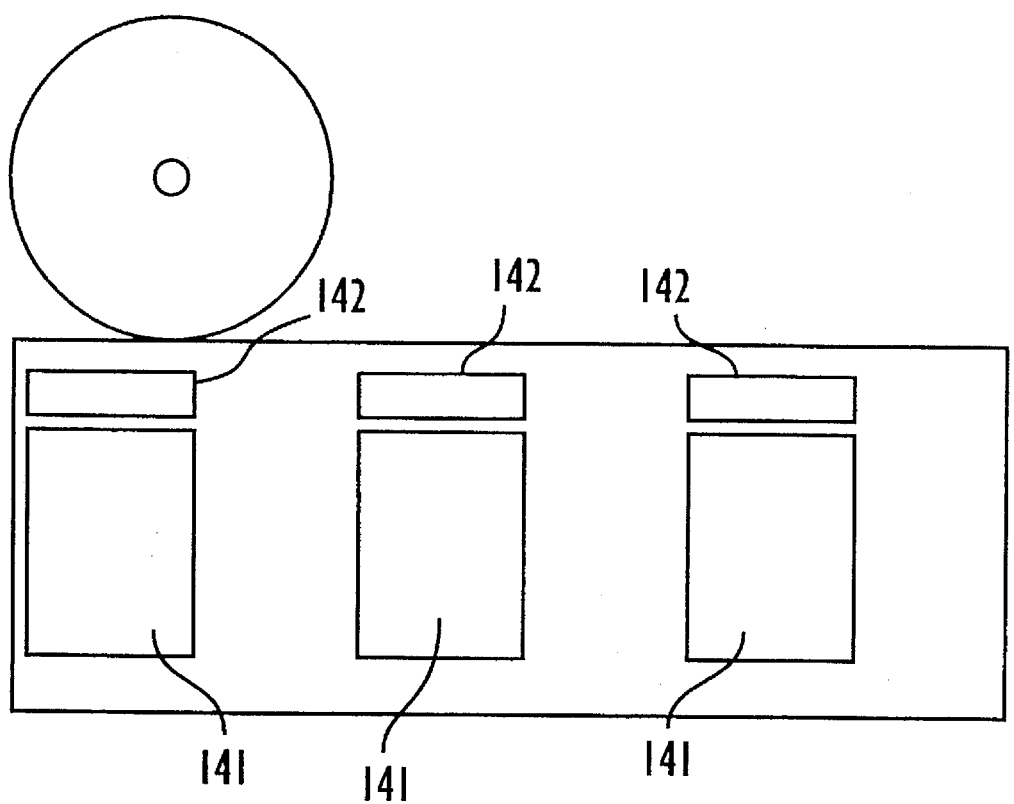
FIG. 13 is an unfolding view of a cylindrical chopper in the temperature distribution measurement apparatus in another embodiment of this invention.

Furthermore a light intercepting component 122 is positioned on the inside of the housing 100. FIG. 13 is an illustration of the cylindrical chopper 140 unravelled. The rotation of the motor 130 drives the rotation member 110 and the cylindrical chopper 140. The output of the infrared array sensor 111 is shown in FIG. 14.

Figure 14:
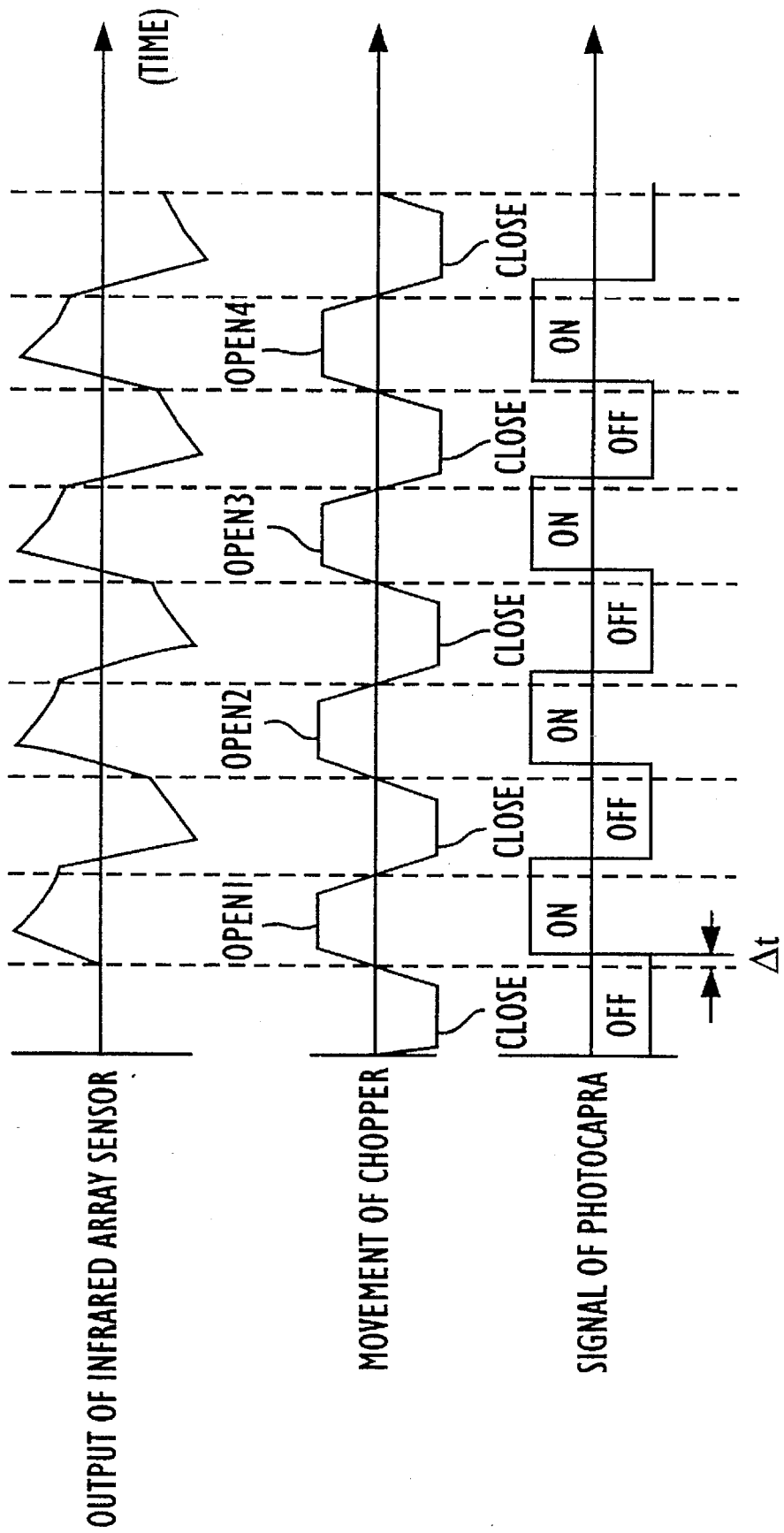
FIG. 14 14 is a graph showing the timing of the chopper.

FIG. 14 shows the relation between measuring time, change in phase of the cylindrical chopper 140, the signal of the photocoupler 113 and the output signal of the infrared array sensor 111.

In FIG. 14, at the time the measurement begins, the direction of the infrared array sensor 111 and infrared lens 112 is fixed at 0 degrees. The chopper starts in a closed phase and then transitions through an opened and closed phase once while the rotation member 110 rotates 3 degrees. The number of gear teeth of the transmission 131 is determined to satisfy the above requirements.

The signal from the photocoupler 113 and the output signal of the infrared array sensor 111 are not necessarily synchronized.

Furthermore, if the signal from the photocoupler 113 and the output signal from the infrared array sensor 111 are consistently offset from one another, (for example $\Delta t$ shown in FIG. 14,) it is possible for the CPU 16 to compensate for the offset during the processing of data.

The output of the infrared array sensor as shown in FIG. 14, is detected by processing the signal of the infrared rays which is always delayed $\Delta t$ from the signal of the photocoupler. One method of estimating the measured temperature comprises an A/D transformation of the digital signal, as explained below. The electric circuit of this example is the same as FIG. 6.

First, the memory data stored after an A/D conversion of the light intercepting component 122 of the infrared array sensor 111 (assuming there are channels from 1 to n), is cleared. Next, after $\Delta t$ of a signal from the photocoupler 113 which corresponds to the sensor input phase, the output signals of the infrared array sensor 111 from the 1st channel to the n'th channel are input for an A/D conversion in sequence at a certain frequency according to the multiplexer 14.

On each channel, one output value after the conversion (the i'th data of Si example) is added to the integral value integrated up to one value before, and the resultant value of S total=S total+Si is obtained.

The above process is repeated a predetermined number of times which relates to the number of sampling times established in advance (e.g., set up time) and the value for each channel is taken for the period of the chopper's one opened state.

By determining a relation between the temperature and integral value obtained in the foregoing set up time established in advance, the one dimensional temperature distribution of an open space is accurately measured.

If at the time of close of a phase of the chopper, the above number of samplings times is arbitrarily fixed without summing up over the whole range. The feature of this example is effective in the case when the output signal of the infrared array sensor 111 comprises a large noise component. In this example, error was computed for a maximum value of noise and the result of the measurement was barely affected by the high-frequency noise.

In addition, in the above measured example, after finishing the A/D conversion, the integral processing of the signals is performed before the next data is sampled. However, in this case, the sampling cycles may likely be extended.

So, by having all the required data collected within a given time and stored once in the memory and released for a calculation processing all at once, a higher speed sampling can be possible.

Figure 15A:
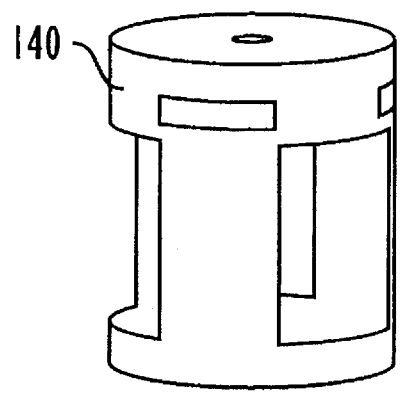
FIG. 15A is a perspective view of a cylindrical chopper.
Figure 15B:
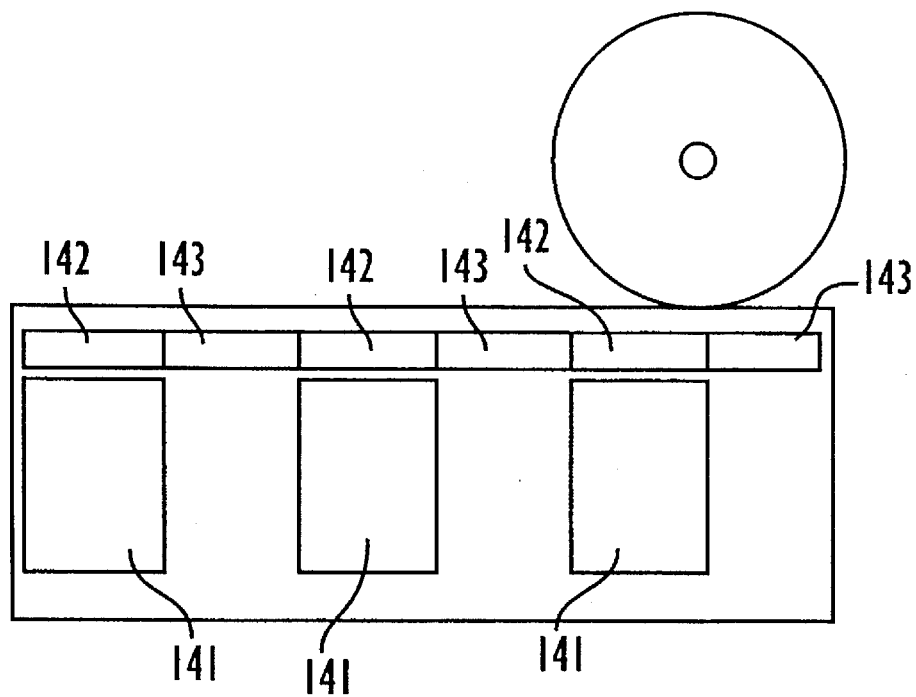
FIG. 15B is an unfolding view of a cylindrical chopper.

And as shown in FIG. 15, by forming windows 143 in the chopper 140, luminescence from a photodiode of the photocoupler 113, can be incident on a photodiode element located on the housing 100.

The light intercepting component 122 is controlled so as to exhibit the starting and stopping position of rotation, and to receive luminescence from a photodiode of the photocoupler 113 by rotation of rotation member 110. It is also possible to vary the starting and stopping position of the rotation member 110.

When the rotation member 110 rotates forward, and the photocoupler 113 reaches the stopping position, by the signal of the light intercepting component 122 set up at the end position, the motor 130 is stopped and the rotation member 110 is rotated backward.

When the infrared array sensor 111 faces the initial direction, through the signal of the light intercepting component 122, backward rotation is halted. During this period, the chopper 140 also rotates backward.

Furthermore, it can be possible to control either forward rotation or backward rotation of the rotation member 110 using the signal of a light intercepting component 122.

Additionally, the chopper 140 can be stopped or continuously rotated during the backward rotation of the rotation member 110.

Moreover, the rotation member 110 can only be rotated backward by changing gears or using other gear system.

Moreover, as another embodiment, it can be possible to control the total rotation angle of the rotation member 110 with the signal of the photocoupler 113.

As the signal of the photocoupler 113 corresponds to a constant rotation angle, a certain number of signals from the photocoupler 113 can be chosen to stop or rotate the rotation member 110 in reverse.

For instance, as shown in this embodiment, chopping occurs once while the rotation member 110 rotates 3 degrees, and when the chosen number of signals from the photocoupler 113 reaches 40, rotation of the motor 130 is stopped and 120° of sensing is accomplished.

Figure 16A:
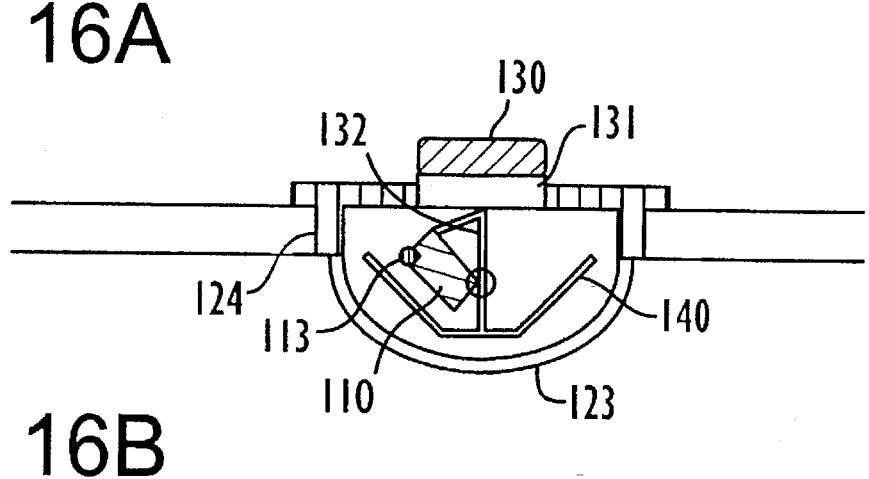
FIG. 16A is a partially cutaway perspective view showing the outline of the temperature distribution measurement apparatus in another embodiment of this invention.

FIG. 16A is a perspective view of another embodiment of this invention. A rotation member 110, has a pyroelectric type infrared array sensor 111 wherein a multiple number of detector elements are laid out in a linear form and an infrared lens 112 is positioned in front of the infrared array sensor 111 such that the incident infrared rays are focused on the pyroelectric type infrared array sensor 111. Furthermore, a photocoupler 113 is positioned on the pyroelectric type infrared array sensor 111 to detect the phase of chopping.

Figure 16B:
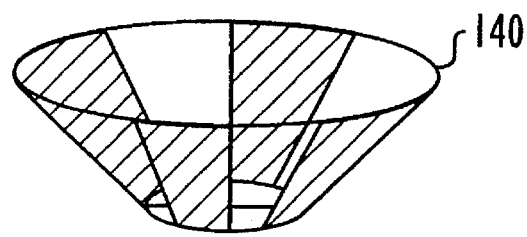
FIG. 16B is a perspective top plan view showing the chopper of the temperature distribution measurement apparatus in another embodiment of this invention.
Figure 16C:
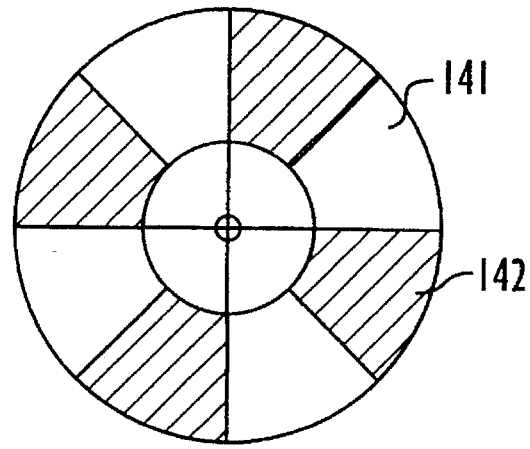
FIG. 16C is perspective view showing the chopper of the temperature distribution apparatus in another embodiment of this invention.

FIG. 16B and FIG. 16C show the perspective and plane view of an umbrella shaped type chopper, respectively.

Figure 16D:
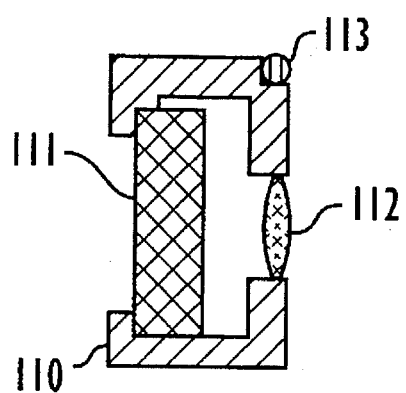
FIG. 16D is a partially cutaway perspective view showing the outline of the temperature distribution measurement apparatus in another embodiment of this invention.

FIG. 16D is cross-sectional view of the rotation member 110.

The chopper 140 of the umbrella shaped type having windows 141 is positioned in front of the infrared lens 112, and cuts off the incident infrared rays intermittently. The chopper 140 has a reflecting plane 142 to reflect the luminescence of the photocoupler 113.

The chopper 140 and the rotation member 110 are connected mechanically with a motor 130 through the shaft 132, and rotate at different rotation speeds in accordance with the transmission 131.

Using the above mentioned construction, temperature distribution can be measured in the same way.

In addition, instead of using a photocoupler 113 as a means for detecting chopping, a hole element, an electric contact signal, etc., can be used.

A disc type chopper is also available for the chopping.

EXAMPLE 9

Figure 17:
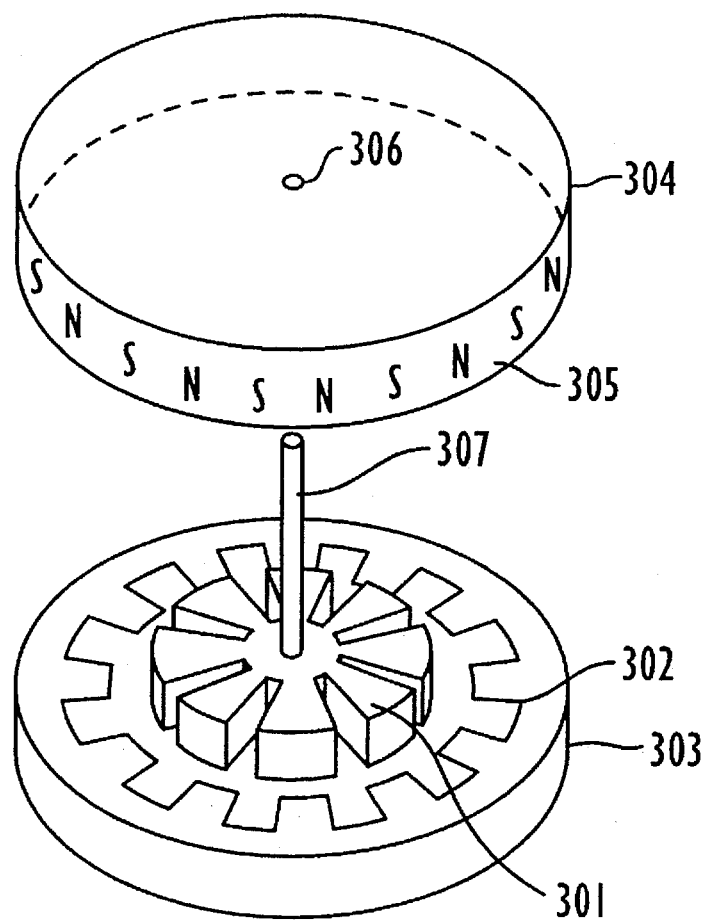
FIG. 17 is a perspective view showing a brushless motor of the temperature distribution measurement apparatus in another embodiment of this invention.

FIG. 17 is a perspective view of an embodiment using a brushless motor of this invention.

Above the disc shaped base 303, several electromagnet coils are arranged in a concentric circle, and a frequency generator pattern 302 is wired in a zigzag pattern around an axle 307 of the disc shaped base 303.

The axle 307 is positioned at the center of the disc shaped base 303, while inside the fringe of a motor cover 304 a permanent magnet 305 is positioned, and there is a hole 306 for inserting the axle 307.

This type of brushless motor rotates with repulsion and attraction owing to the flowing of electricity in the electromagnetic coil 301.

In this case the induced magnetic field crosses the frequency generator pattern 302, so the electricity is induced on the frequency generator pattern 302.

By using this induced electricity, the rotation speed of the brushless motor is controlled. In this way, randomness in each direction can be decreased.

And using induced electricity, the phase of rotation of the rotation member 110 and the chopper 140 can be estimated.

Therefore, the timing of signal processing can be automatically established without a photosensor etc.

Furthermore, it is possible to build in control circuitry for the brushless motor.

As a result, the number of cables can be decreased and the compact temperature distribution measurement apparatus can be realized.

In addition, by using the brushless motor, superior sensitivity is accomplished compared with a motor with brushes, because the brushless motor generates a smaller amount of electromagnetic noise.

EXAMPLE 10

As shown in FIG. 12, a bundle of cables 120 is required to transmit the signal generated in the infrared array sensor 111, from the housing 100.

Figure 18:
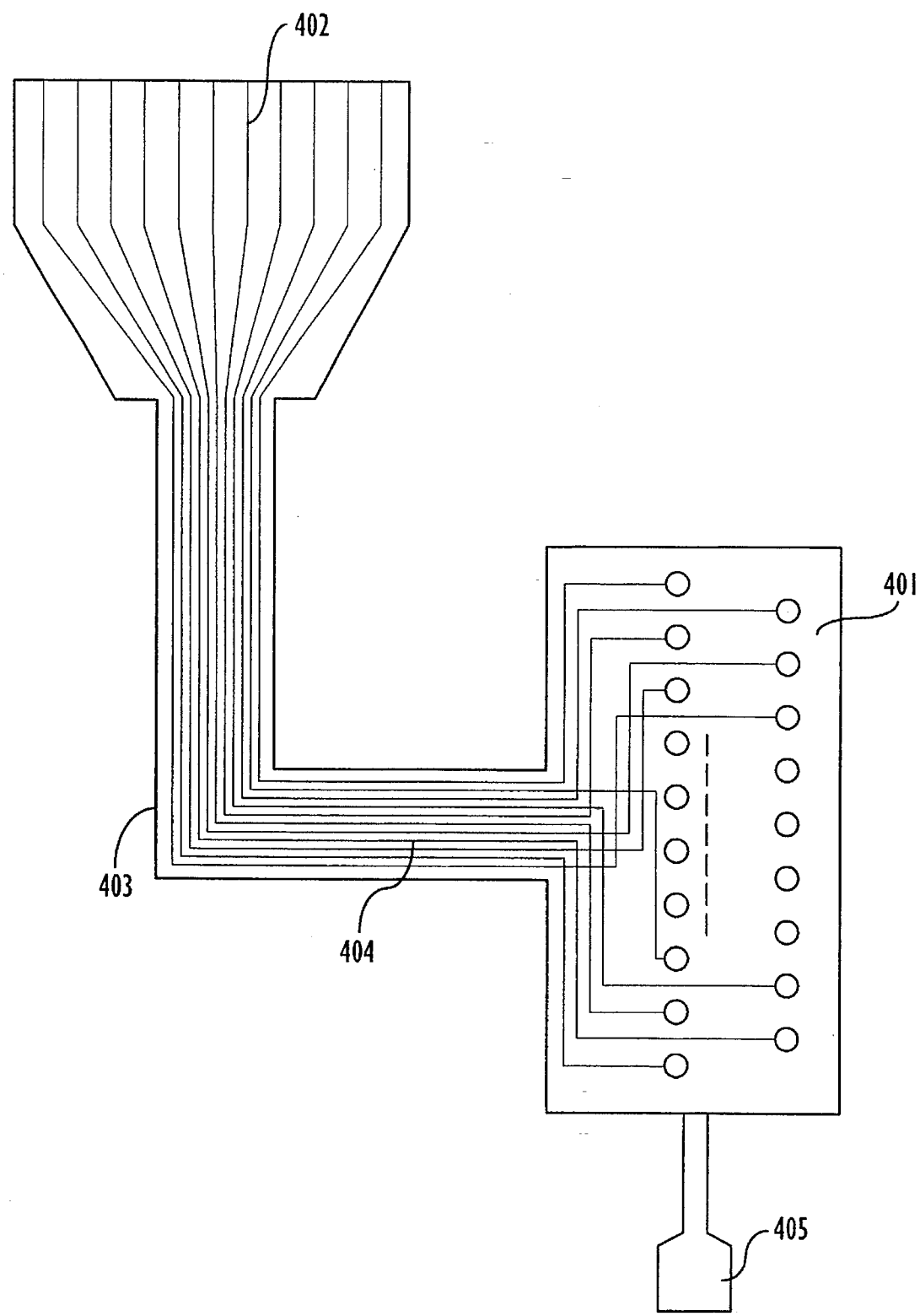
FIG. 18 is a plane view showing a wire cable of the temperature distribution measurement apparatus in another embodiment of this invention.

Cables 120 are connected to nowhere, and FIG. 18 shows the state of the cables 120 under no external force. FIG. 18 shows the configuration of the bundle of cables 120. One end 401 of the bundle of cables 120, which is connected to the infrared array sensor 111, has a rectangular shape and the other end 402, which is connected to the outside surface of the housing 100, has a pentagonal shape, and the middle part 403 between the ends is bent at a right angle at the center of the cables 120.

The material of the disc base 303, as shown in FIG. 17, is flexible, such as plastic or similar materials. And signal cables 404 are wired above it.

As shown in FIG. 12, with reference to FIG. 18, the rectangular end 401 of the cables 120 is connected to the infrared array sensor 111, the middle connecting part of the cables 120 is bent at the side of the rectangular end 401, and the other end 402 is led through a hole in the housing 100 is bent at a right angle, and is connected to the surface of the housing 100.

It is possible to bend the middle connecting part 403 at right angles.

And, in the case of the infrared array sensor 111 being rotated 180 degrees or 360 degrees, the middle connecting part 403 absorbs the deformation. So this bundle of cables 120 is superior in compactness and flexibility.

Similarly to this embodiment, it is possible to provide a simple construction leading the middle connecting part 403 of the cables 120 from the side of housing 100.

It is also possible to lead the cables 120 out from the bottom or the topside of the housing 100. Furthermore, it is possible to form the middle connecting part 403 to be of a spiral configuration. In this configuration, it is possible to absorb the deformation in the case of two or three rotations of the rotation member 110.

Furthermore, it is possible to incorporate a signal cable 405 to a flexible substrate in order to provide a lead out from the housing 100.

In this instance, the signal cable 405 leads the signal from the photocoupler 113.

It is also possible to equip a thermistor for measuring temperature to the rotation member 110. And it is also possible to incorporate the signal cable 405 connected with this thermistor to the flexible substrate in order to provide a lead out from the housing 100. In addition, it is possible to mount the thermistor to the flexible substrate.

EXAMPLE 11

The temperature distribution measurement apparatus of the embodiment of this invention can be applied to a program rating measuring system.

Namely, the position where viewers usually watch the television is measured to record the infrared rays emitted from viewers. For instance, this system can be set up on the television set.

By using this compact apparatus, it is easy to measure the accurate program rating.

And, if the television is turned on, the temperature distribution is measured, and the size of the audience is estimated as mentioned above. The data related to the number of viewers is transmitted to the outside through a telephone cable.

This data need include only the data disclosing the number of viewers, so the amount of data to be transmitted can be minimized.

A long expected life span of this system is accomplished and the situation of the audience is determined exactly by working the system only when the television set is turned on.

EXAMPLE 12

The infrared lens in this embodiment is, for instance, a spherical silicon lens.

A spherical silicon lens comprises silicon of polycrystalline, and both sides of (convex) the spherical surface are polished and an antireflection layer is formed.

This material is not expensive and is easy to manufacture. A chalcogen spherical surface lens is also available. This is made from KRST, Ge, $GeSe_1$, $GeTe_3$ and manufactured through a process of direct pressing, a process of coating both sides of the lens with an antireflection coating.

As a result, it is possible to make a superior lens having a high permeability, minimal aberration, minimal distortion of thermal image, superiority in mass production, and high sensibility. As antireflection coatings mentioned above, sputter coatings with evaporation of ZnS are used.

The thickness of this antireflection coating is $\lambda/4n$ ($\lambda=10$ μm, n denotes an index of refraction of the lens).

In addition, the infrared array sensor is not restricted to infrared array sensors of a pyroelectric type.

Also the driving means are not restricted to a motor.

The embodiments described above provide a number of significant advantages. They enable a temperature distribution measurement apparatus to achieve a resolving power of n×m, where n is the number of detector elements equipped on the infrared array sensor and m is the number of measurements taken in every complete revolution of the sensor. Depending on the choice of n and m, this apparatus can provide a very accurate means of measuring the temperature distribution in an area. Moreover, because the present invention also provides a cooling means by equipping the chopper with fins, cooling can be achieved at little additional cost.

A further cost-efficient attribute of the apparatus of the present invention is that it may utilize a lens comprised of polycrystalline or chalcogen, both of which are inexpensive materials, easily manufactured and readily available.

Still another advantage is that the temperature distribution measurement apparatus of the present invention may be very compact in size by utilizing a brushless motor, which eliminates the need for a separate timing system and can be controlled by built in control circuitry, which reduces the number of cables required.

It is to be understood that the present invention is by no means limited to the particular construction herein disclosed and/or shown in the drawings, but also includes any modifications or equivalents within the scope of the disclosure and the claims.

We claim:

1. A temperature distribution measurement apparatus comprising:
   (a) an infrared array temperature sensor, which provides temperature output signals from which a temperature distribution is measured, disposed on a rotation member,
   (b) a focusing means for focusing incident infrared rays on said infrared array temperature sensor,
   (c) a chopping means for intermittently shielding incident infrared rays from said infrared array temperature sensor, said chopping means rotating around said infrared array temperature sensor, and
   (d) a driving means for continuously rotating said rotation member, said infrared array temperature sensor and said chopping means while synchronizing the rotation of said chopping means with said rotation member.

2. The temperature distribution measurement apparatus of claim 1 further comprising a timing means for detecting timing for chopping which is located on said chopping means or said rotation member.

3. The temperature distribution measurement apparatus of claim 2 wherein the starting time and stopping time of sampling the output signal of said infrared array temperature sensor is controlled by a signal detected by said timing means.

4. The temperature distribution measurement apparatus of claim 2 further comprising an adder means for calculating the temperature measurement by successively adding sampled output signals in predetermined periods.

5. The temperature distribution measurement apparatus of claim 1 further comprising a housing for supporting said chopping means and said rotation member, and a position detecting means for detecting the position of said rotation member, arranged on said housing and said rotation member.

6. The temperature distribution measurement apparatus of claim 1 wherein the driving means is a brushless motor.

7. The temperature distribution measurement apparatus of claim 6 wherein said brushless motor has a frequency generator pattern and a permanent magnet, and the rotation speed of said brushless motor and the condition of rotation of said rotation member and said chopping means is controlled by induced electric current caused by movement of said permanent magnet on said frequency generator pattern.

8. The temperature distribution measurement apparatus of claim 6 further comprising cables wired on a flexible substrate, one end of said cables being connected to said rotation member, another end being connected to a housing and a middle part of said cables being bent or twisted.

9. The temperature distribution measurement apparatus of claim 8 wherein said cables include a signal cable for a timing means a signal cable for a thermistor, or a signal cable for the timing means and a signal cable for the thermistor.

10. The temperature distribution measurement apparatus of claim 1 wherein said chopping means has fins for cooling said infrared array temperature sensor by its movement.

11. The temperature distribution measurement apparatus of claim 1, wherein said infrared array temperature sensor includes an infrared lens which comprises a spherical chalcogen glass lens or a spherical silicon lens.

12. The temperature distribution measurement apparatus of claim 1 wherein said focusing means is arranged in front of said infrared array temperature sensor.

13. The temperature distribution measurement apparatus of claim 1 wherein a direction of rotation of the driving means is changed by rotating the driving means backward.

14. The temperature distribution measurement apparatus of claim I further comprising:

(a) a computational means for determining number and position of persons in a space by measuring the temperature distribution in said space; and (b) a detector means for detecting movements of persons by analyzing change in said temperature distribution of said space with respect to time.

15. The temperature distribution measurement apparatus of claim 1 further comprising:

(a) a measurement means for measuring the temperature distribution in space facing an audiovisual media during said media being at work; and (b) a computational means for determining the number of persons in the space from said temperature distribution in said space and transmitting data of the number of persons to a program rating measuring system.

16. The temperature distribution measurement apparatus of claim 1, wherein the infrared array temperature sensor is a one-dimensional infrared sensor.

17. The temperature distribution measurement apparatus of claim 1, wherein the infrared array temperature sensor is driven in one direction and subsequently in the opposite direction along an axis of rotation.

18. The temperature distribution measurement apparatus of claim 1, wherein said chopping means is cylindrical.

19. A temperature distribution measurement apparatus comprising:

(a) an infrared array temperature sensor, which provides temperature signals from which a temperature distribution is measured, disposed on a rotation member, (b) a focusing means comprising an infrared lens for focusing incident infrared rays on the infrared array temperature sensor, (c) a cylindrical chopping means having windows on the side which are equidistant from one another for intermittently shielding incident infrared rays from said infrared array temperature sensor, said chopping means rotating around said infrared array temperature sensor, (d) a driving means for continuously rotating said chopping means and for continuously rotating together said rotation member, said infrared array temperature sensor and said focusing means, wherein rotating of said cylindrical chopping means/a synchronized with said rotation member, (e) a housing for supporting said cylindrical chopping means and said rotation member, and (f) wire cables disposed on a flexible substrate, one end of said cables being connected to said rotation member, another end being connected to said housing and a middle part of said cables being bent or twisted.

20. The temperature distribution measurement apparatus of claim 19 wherein said chopping means has n windows and rotates $\theta_c$ degrees, while said rotation member rotates $\theta_s$ degrees during a chopping cycle and satisfies the equation:

$$\theta_c = (360/n \pm \theta_s).$$

21. The temperature distribution measurement apparatus of claim 15 wherein said chopping means has n windows and rotates $\theta_c$ degrees, while said rotation member rotates $\theta_s$ degrees during a chopping cycle and satisfies the equation:

$$\theta_c/\theta_s = \text{integer}.$$

22. The temperature distribution measurement apparatus of claim 19, wherein the infrared array sensor is a one-dimensional infrared sensor.

23. A temperature distribution measurement apparatus comprising:

(a) an infrared array temperature sensor, which provides temperature signals from which a temperature distribution is measured, disposed on a rotation member;

(b) a focusing means for focusing incident infrared rays on said infrared array temperature sensor;

(c) a cylindrical chopping means having windows on the side which are equidistant from one another for intermittently shielding incident infrared rays from said infrared array temperature sensor, said chopping means rotating around said infrared array temperature sensor;

(d) a brushless motor for continuously rotating said chopping means and for continuously rotating together a rotation member, said infrared array temperature sensor and said focusing means, wherein rotating of said cylindrical chopping means is synchronized with said rotation member;

(e) a housing for supporting said chopping means and said rotation member;

(f) cables wired on a flexible substrate, one end of said cables being connected to said rotation member, another end of which being connected to said housing and a middle part of said cables being bent or twisted.

24. The temperature distribution measurement apparatus of claim 23, wherein the infrared array sensor is a one-dimensional infrared sensor.

* * * * *